United States Patent [19]

Lukacs

[11] 3,714,505

[45] Jan. 30, 1973

[54] DYNAMIC FOCUS CORRECTION APPARATUS FOR A RECTILINEARLY RASTER SCANNED ELECTRON BEAM

[75] Inventor: Michael Edward Lukacs, Long Branch, N.J.

[73] Assignee: Bell Telephone Laboratories, Incorporated, Murray Hill, N.J.

[22] Filed: Dec. 1, 1970

[21] Appl. No.: 93,944

[52] U.S. Cl. ..........................315/31, 313/83, 315/22

[51] Int. Cl. ..........................H01j 29/56

[58] Field of Search .......315/22, 31; 178/5.4; 313/83

[56] References Cited

UNITED STATES PATENTS

| | | | |
|---|---|---|---|
| 2,951,965 | 9/1960 | Durval | 315/22 |
| 3,177,396 | 4/1965 | Brooks | 315/31 TV |
| 3,422,305 | 1/1969 | Infante | 315/31 R |
| 3,496,408 | 2/1970 | Kirkham | 315/31 R |

*Primary Examiner*—Carl D. Quarforth
*Assistant Examiner*—E. E. Lehmann
*Attorney*—R. J. Guenther and E. W. Adams, Jr.

[57] ABSTRACT

To maximize the resolution of a rectilinearly raster scanned electron beam over the entire image area of a cathode ray tube, the signals from the horizontal and vertical deflection circuits are combined vectorially to obtain a voltage proportional to the radial distance of the focused spot from the center of the tube face. This voltage is then shaped, by a diode function generator so as to match the tube's focus voltage versus radial displacement characteristic, amplified, and applied to the focus element of the tube. As the scan spot moves in a rectilinear raster pattern the signal applied to the tube's focus element is continuously altered in a manner such that optimum focusing is always achieved.

13 Claims, 8 Drawing Figures

INVENTOR
M. E. LUKACS
BY John K. Mullarney
ATTORNEY

DYNAMIC FOCUS CORRECTION APPARATUS FOR A RECTILINEARLY RASTER SCANNED ELECTRON BEAM

BACKGROUND OF THE INVENTION

This invention relates to the focusing of cathode ray tubes, and more particularly to the dynamic focusing of the electron beam of a cathode ray tube as it is rectilinearly raster scanned across the face of the tube.

As the electron beam of a cathode ray tube is deflected horizontally and vertically from the center of the tube some degree of defocusing of the beam is experienced. The greater the distance of the focused spot from the center of the tube face, the greater the degree of defocusing of the same. This is well known. In many instances, such as commercial entertainment television, high resolution over a complete raster is not essential and a certain amount of defocusing and consequent loss of resolution can be tolerated. In other instances, this is not the case. For example, in a single pickup tube color camera arrangement, such as disclosed in the patent to R. L Eilenberger, U.S. Pat. No. 3,534,159, issued Oct. 13, 1970, the information density on the target surface is high and this necessitates optimum resolution (i.e., good focusing) over the entire image area. Holographic television transmission systems, such as disclosed in the article "Television Transmission of Holograms Using a Narrow-Band Video Signal" by J. E. Berrang, *The Bell System Technical Journal*, May-June 1970, Vol. 49, No. 5, pages 879–887, present a further instance where high resolution over the entire image area is essential.

Now efforts have been made heretofore to achieve optimum focusing by changing the magnitude of the focus potential with displacement of the electron beam from the center of the tube. This technique is referred to as "dynamic focusing." It typically comprises the application of a unidirectional potential to the focus element of a cathode ray tube to establish the proper focus condition at the center of the tube and the concurrent application of a varying signal to preserve that condition throughout the scanning raster. Since, in the normal case, the beam focus changes approximately in accordance with a parabolic function along either scanning direction, it has heretofore been proposed that the varying components of focus potential have a parabolic waveform in both axes. In accordance with such prior art proposals, a parabolic function is developed for each direction of beam scan and these are summed or added together, with the sum signal then applied to the focus electrode (see U.S. Pat. Nos. 2,918,602, to Fyler et al., issued Dec. 22, 1959, and 2,951,965, to Durnal, issued Sept. 6, 1960). This prior art approach is admittedly a first order approximation; focus correction is maintained within some error percentage (e.g., ±5.5% to ±17%) and for the particular prior art use intended this error can presumably be tolerated. A further and perhaps more serious shortcoming, however, of this prior art approach of parabolic functions addition is that a focus over-correction or over-compensation occurs for the corners of the image area. And, this over-correction results in poor resolution in and about the corners of said image area.

It is, therefore, the primary object of the present invention to achieve optimum focusing of the beam of a cathode ray tube over the entire image area.

A related object of the invention is to derive a focus correction signal that substantially matches a cathode ray tube's focus versus radial displacement characteristic.

SUMMARY OF THE INVENTION

The apparatus constructed in accordance with the principles of the present invention serves to generate a varying focus correction signal that is shaped to match the focus voltage versus radial displacement characteristic of a camera or display tube, irrespective of whether the same is parabolic, as is usually the case, hyperbolic, or any other non-linear function. When this correction signal is applied to the tube's focus element(s), it thus insures optimum focusing of a rectilinearly raster scanned electron beam over the entire image area.

To this end, signals from the horizontal and vertical cathode ray deflection circuits are combined in a vectorial manner so as to obtain a voltage proportional to the radial distance of the focused spot from the center of the tube face. This vector voltage is then shaped by a diode function generator to substantially match the tube's focus voltage versus radial displacement characteristic. The shaped signal is then amplified and applied to the focus element(s) of the tube. Thus, as the scan spot moves in a rectilinear raster pattern the signal applied to the tube's focus element(s) is continuously altered in a manner such that optimum focusing is always achieved.

In accordance with a feature of the present invention the function generator is preferably composed entirely of diodes. Since a diode is the smallest element that can be produced on an integrated circuit substrate, an all diode function generator is exceedingly compact and thus particularly well suited, for example, for use in video telephone sets.

BRIEF DESCRIPTION OF THE DRAWINGS

The invention will be more fully appreciated from the following detailed description when the same is considered in connection with the accompanying drawings in which.

Detailed Description

If measurements are made on a kinescope (e.g., a Westinghouse WX3076P high resolution, electrostatically focused, cathode ray display tube), it will be found that as the electron beam is displaced either horizontally or vertically from the center of the tube, the focus electrode voltage must be increased to regain optimum focus. As is known, the shape of these focus voltage versus deflection curves is approximately parabolic, but unfortunately the amplitude of the horizontal correction parabola is influenced by vertical displacement and that of the vertical parabola by horizontal displacement.

Figure 1:
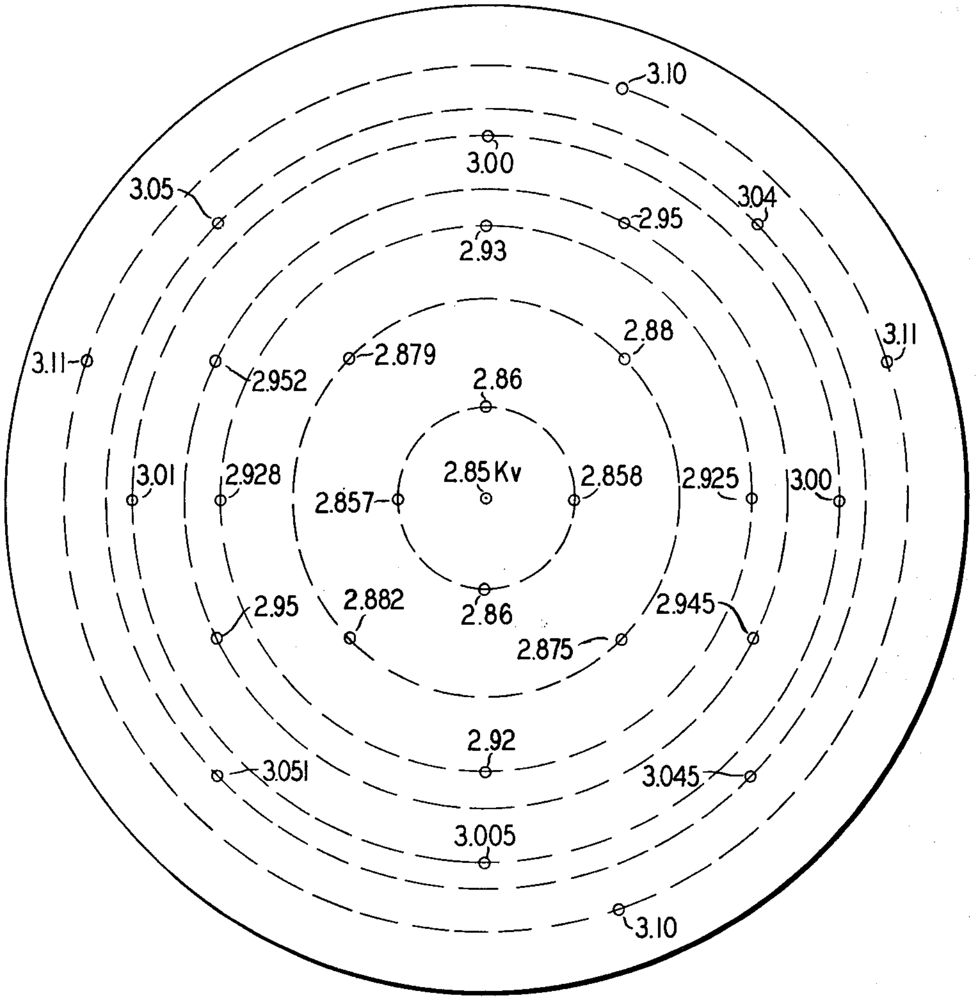
FIG. 1 is a plot of the optimum spot focus voltage versus radial displacement characteristic for a typical cathode ray tube.
Figure 2:
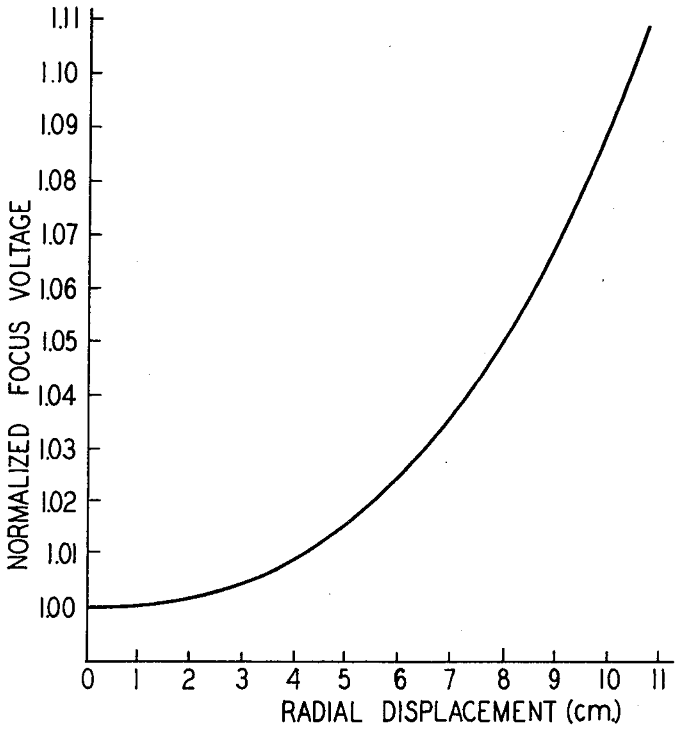
FIG. 2 is a curve of focus voltage versus radial displacement which corresponds to the plot of FIG. 1.

FIG. 1 is a plot of various focus electrode voltages for different beam spot positions for the above-noted kinescope. While only a few illustrative spot positions have been shown in FIG. 1, it will be apparent that the needed focus correction curve is on the whole radially symmetrical. That is, the optimum spot focus voltage is a function of the radial distance of the displaced spot from the center of the tube face, but this function is substantially the same for all angular coordinates. Accordingly, a curve of optimum spot focus voltage versus radial displacement can be derived and this curve will hold for all angular coordinates. FIG. 2 shows such a curve for the aforementioned kinescope. The focus voltage or ordinate axis is normalized, with the static or center focus voltage constituting the norm (i.e., 2.85 Kv.=1.00). The curve of FIG. 2 is roughly parabolic in shape, as are the corresponding focus voltage vs. radial displacement curves of a good many other camera and display tubes. However, as will be evident hereinafter, the exact shape of this curve is of little consequence to the dynamic focusing technique of the present invention.

The radial displacement of the scan spot is continuously altered as a cathode ray electron beam is raster scanned and thus it should be apparent that if a varying focus voltage can be derived that is a parabolic function of this radial displacement (i.e., as per the curve of FIG. 2), optimum focusing will be assured over the entire image area of the kinescope.

Now voltages proportional to the horizontal and vertical spot displacements can be obtained directly from the horizontal and vertical deflection circuits. Accordingly, a voltage ($V_r$), proportional to the radial spot displacement, can be derived from the vector sum of the horizontal and vertical deflection voltages:

$$V_r = \sqrt{V_h^2 + V_v^2}$$

where $V_h$ = horizontal deflection voltage, and $V_v$ = vertical deflection voltage. The aforementioned radial symmetry makes the angular coordinate unimportant. If the real-time value of the analog voltage $V_r$ is then shaped in accordance with the tube's focus voltage vs. radial displacement characteristic, a real-time focus correction signal will be obtained which, when superimposed on the static focus voltage, assures optimum focusing of the scan spot over the entire image area.

Figure 3:
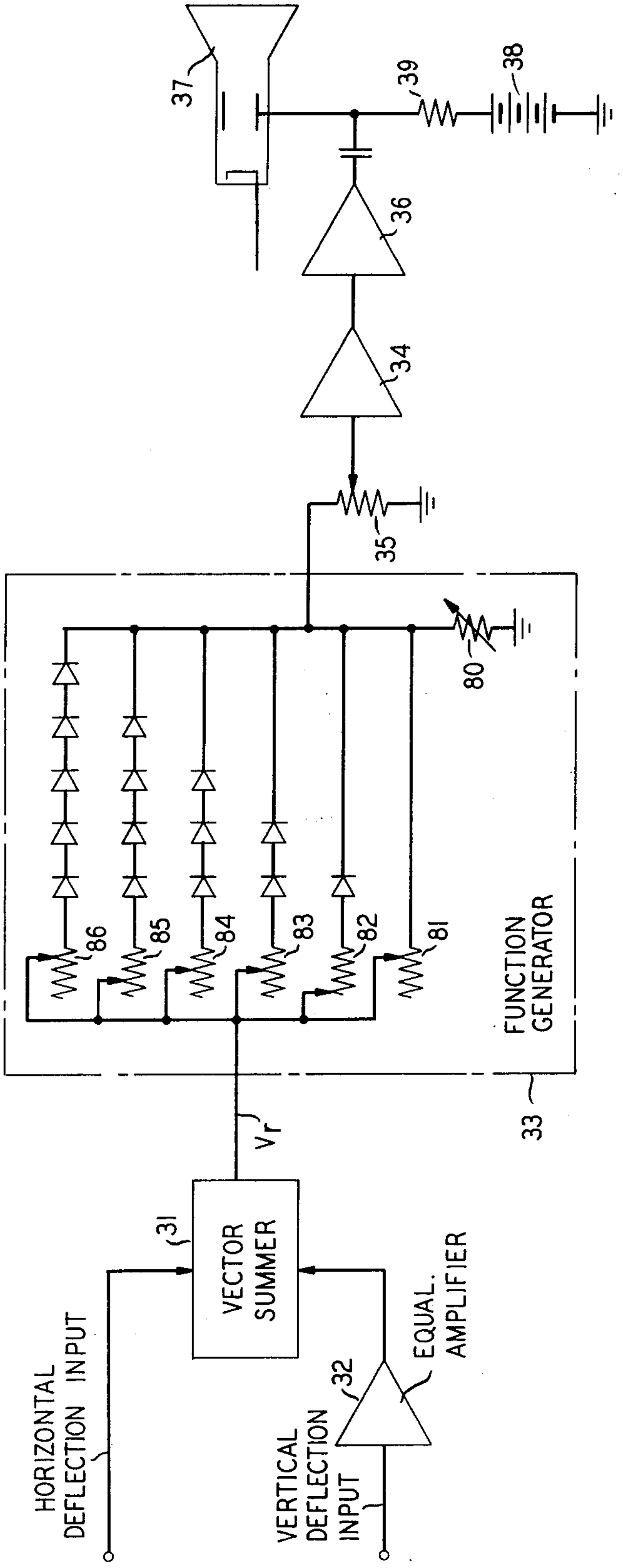
FIG. 3 is a schematic diagram of focus correction apparatus constructed in accordance with the present invention.

FIG. 3 illustrates the dynamic focus correction apparatus for carrying out the above-recited functions in accordance with the invention. The horizontal and vertical deflection circuits (not shown) produce voltages that correspond to the desired horizontal and vertical spot deflections. For the conventional raster scan these deflection voltages are typically ramp or sawtooth type signals. The horizontal deflection voltage is delivered directly to the vector summer 31, while the vertical deflection voltage is coupled thereto via the equalization amplifier 32. The input signals to vector summer 31 should be the exact analogs of the spot deflections; this is accomplished by the equalization amplifier 32. To this end, the gain of amplifier 32 is set such that the peak-to-peak voltage ratio of the input signals to summer 31 is equal to the aspect ratio of the tube. For example, for commercial entertainment television the aspect ratio (i.e., picture width to height) is 4:3 and therefore the ratio of the input signals to summer 31 should be the same: $V_h/V_v = 4/3$.

As the name implies, the vector summer 31 develops a voltage $V_r$ that is the vector sum of the input horizontal and vertical deflection voltages ($V_r = \sqrt{V_h^2 + V_v^2}$) and this vector voltage is directly proportional to, and is the voltage analog of, the radial displacement of the beam spot from the center of the tube face. The vector summer 31 will be described in detail hereinafter. The output of summer 31 is delivered to the function generator 33 where it is shaped, in the manner to be described, so as to match the tube's focus voltage vs. radial displacement characteristic (such as that shown in FIG. 2). The function generator output signal is coupled to the driver stage 34, via the potentiometer 35, and thence to the high voltage amplifier 36. The driver 34 comprises a conventional transistor amplifier stage that provides moderate gain and isolation. The amplifier 36 should, of course, be chosen to complement the focusing system used. For electrostatic focusing of the typical kinescope, a voltage swing of up to 600 volts and a frequency response from 30 Hz to 30 kHz is usually needed. A number of high voltage, vacuum tube amplifier circuits meet these requirements. For example, an amplifier circuit using an EIMAC 4–125A transmitting tube is capable of a 1000 volt swing at more than 50 kHz. The output of amplifier 36 is capacitively coupled to the focus element, or elements as the case may be, of the cathode ray tube 37. The unidirectional voltage source 38 supplies the requisite static or center focus voltage to the focus element(s) of the tube via a high resistance 39. This resistance serves to decouple the unidirectional source from the dynamic focus voltage of amplifier 36, while still providing a DC path for said source. The dynamic output voltage of amplifier 36 thus augments the static focus voltage in a manner such that the focus voltage vs. spot displacement characteristic of FIG. 1 is realized and optimum focusing is thereby assured over the entire image area.

Figure 4:
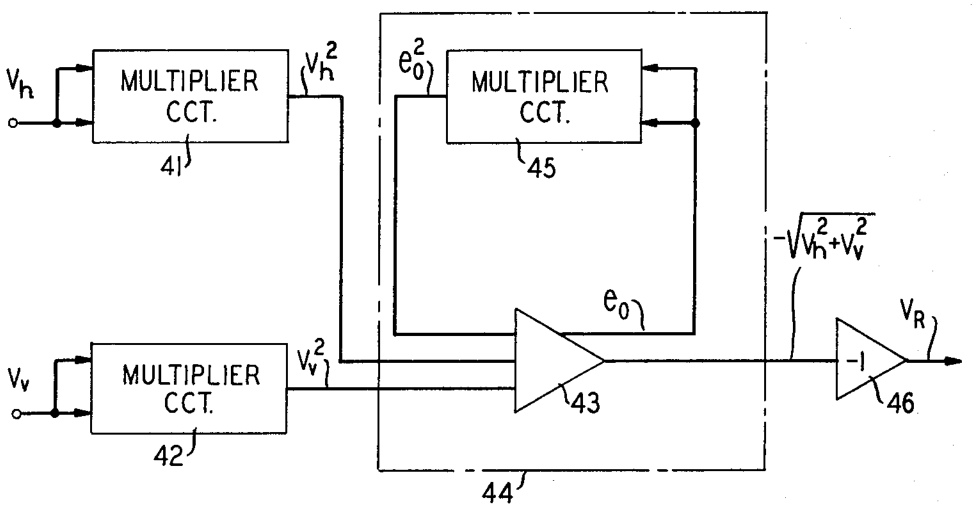
FIG. 4 is a schematic block diagram of a preferred embodiment of the vector summer shown in FIG. 3.

The vector summer 31 of FIG. 3 is shown in greater detail in the schematic block diagram of FIG. 4. The multiplier circuits in this figure comprise standard operational amplifier circuit package modules that are commercially available. The vector summer input signals $V_h$ and $V_v$ are respectively coupled, as dual inputs, to the multiplier circuits 41 and 42 so as to derive the respective outputs $V_h^2$ and $V_v^2$. The latter output signals are then delivered to the summing amplifier 43 of the square root circuit 44. The multiplier 45 of this square rooter is coupled in the feedback path of amplifier 43. The $e_o$ output signal from amplifier 43 is delivered as a dual input to multiplier 45 so as to derive the multiplied output signal $e_o^2$. This $e_o^2$ signal is then coupled back to the input of amplifier 43. The square root operation performed is conventional and, as will be appreciated by those in the art, the output of circuit 44 (i.e., $-\sqrt{V_h^2+V_v^2}$) is a square root function of the input thereto. The inverting amplifier 46 provides at its output the aforementioned vector voltage $V_r$.

Figure 5:
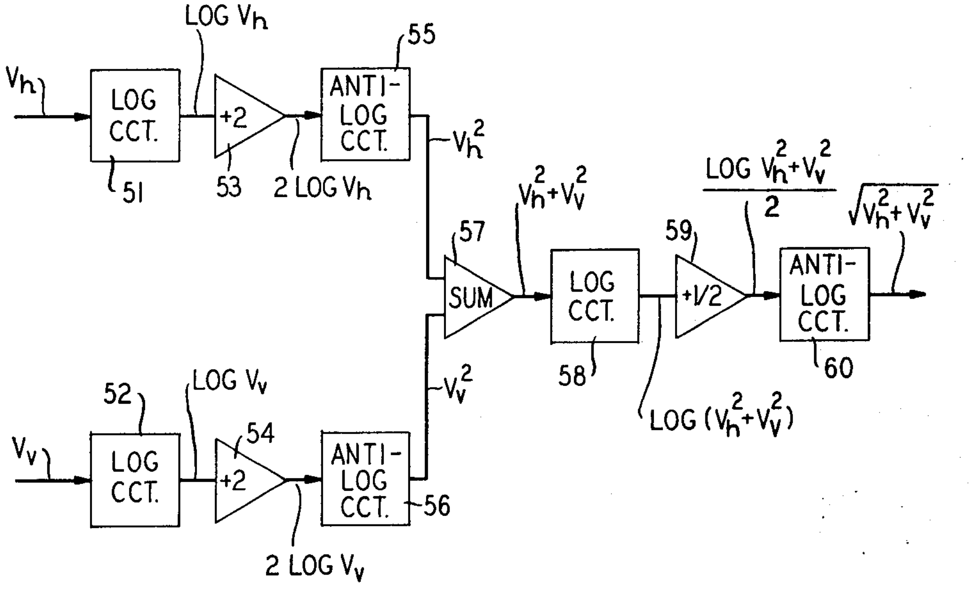
FIG. 5 is a schematic block diagram of an alternative embodiment of the vector summer of FIG. 3.

FIG. 5 is a schematic block diagram of an alternative embodiment of the vector summer 31 of FIG. 3. The log (i.e., logarithmic) and anti-log circuits, here again, comprise standard operational amplifier circuit package modules which are commercially available. The vector summer input signals $V_h$ and $V_v$ are respectively coupled to the log circuits 51 and 52 so as to derive the respective outputs log $V_h$ and log $V_v$. The latter signals are amplified in the gain-of-two amplifiers 53 and 54 and the resultant output signals 2 (log $V_h$) and 2 (log $V_v$) when subject to anti-log operations in the respective circuits 55 and 56 produce the $V_h^2$ and $V_v^2$ input signals to the summing amplifier 57. The log circuit 58 develops the log of the input thereto i.e., log $(V_h^2+V_v^2)$; this log signal is effectively divided by two in the (+ ½) amplifier 59; and the anti-log circuit 60 produces the signal $\sqrt{V_h^2+V_v^2}$ from the output of amplifier 59. This output signal of circuit 60 is, of course, the desired vector voltage $V_r$. The circuit packages per se are conventional, and the mathematical operations carried out are sufficiently straightforward as to obviate further detailed discussion herein. While the schematic block diagram of FIG. 4 represents the preferred embodiment of the vector summer, it should be clear to those in the art that the principles of the invention are not limited to either of the embodiments of FIGS. 4 or 5 and other circuits might be devised for deriving the vector voltage $V_r$ from the deflection voltages $V_h$ and $V_v$.

The output voltage from the vector summer 31 of FIG. 3 is delivered to the function generator 33 which serves to shape the same in accordance with the tube's optimum focus voltage vs. radial spot displacement characteristic. As shown in FIG. 3, the function generator 33 comprises a plurality of parallel connected paths, most of which include one or more diodes, and a variable load resistance 80. Each of the parallel connected paths includes a variable resistance, which is preferably calibrated for a purpose to be described. While silicon diodes are preferred because of their high forward barrier or forward break point voltage (e.g., 0.7 volts), the principles of the invention are in no way limited thereto and any of the other known diode types can be utilized in the manner to be described.

Figure 6:
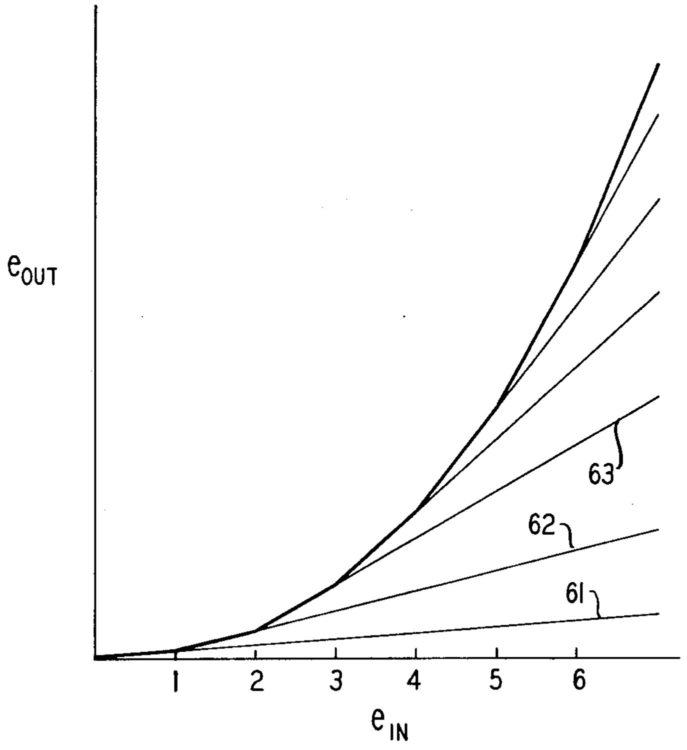
FIG. 6 is a diagram useful in the explanation of the operation of the function generator of FIG. 3.

The diagram of FIG. 6 is useful in explaining the operation of the function generator 33. The abscissa ($e_{in}$) represents the input voltage from the vector summer and the ordinate ($e_{out}$) represents the potential developed across the load resistance 80. The abscissa ($e_{in}$) is graduated or marked off in terms of absolute units or values, where the silicon forward barrier voltage of 0.7 volts = 1. In some instances it may be desirable to use a voltage divider network so as to make the output voltages of summer 31 compatible with the input operating range of the function generator.

The curve of FIG. 2 is substantially matched in FIG. 6 by a process that can perhaps best be termed "approximation by linear segments." For input voltages ($e_{in}$) of less than absolute 1 (i.e., <0.7 volts), only the resistance 81 path of function generator 33 conducts any significant amount of current. The potential developed across the load resistance 80, and the slope $m$ of the line 61 of FIG. 6, is a function of the ratio of the value of resistance 80 to the total circuit resistance i.e., resistance 81 plus resistance 80); that is, this slope is:

$$m=R_{80}/(R_{80}+R_{81}).$$

When the input potential ($e_{in}$) exceeds one unit (0.7 volts), the forward barrier voltage of the diode in the resistance 82 path is exceeded and this path conducts. The potential now developed across the load resistance 80, and the slope $m$ of the line 62 of FIG. 6, is a function of the ratio of resistance 80 to the total circuit resistance, which comprises resistance 80 plus the equivalent resistance of resistances 81 and 82 in parallel. Thus, the slope of line 62 and hence the slope of the linear segment curve between the absolute units 1 and 2 ($m_{1\to 2}$) is as follows:

$$m_{1\to 2}=\frac{R_{80}}{R_{80}+\left[\dfrac{1}{\dfrac{1}{R_{81}}+\dfrac{1}{R_{82}}}\right]}$$

The resistance of the conducting diode is negligible compared to the value of resistance 82 and can be disregarded. By changing the resistance of variable resistance 82 the slope of line 62 can, of course, be changed.

When the input potential ($e_{in}$) exceeds two absolute units (2 × 0.7 volts), the series connected diodes in the resistance 83 path begin conducting. Once again, the potential developed across the load resistance 80, and the slope $m$ of the line 63 of FIG. 6, is a function of the ratio of resistance 80 to the total circuit resistance, which comprises resistance 80 plus the equivalent resistance of resistances 81, 82, and 83 in parallel. Thus, the slope of line 63 and the slope of the linear segment curve between the absolute units 2 and 3 ($m_{2\to 3}$) is as follows:

$$m_{2\to 3}=\frac{R_{80}}{R_{80}+\left[\dfrac{1}{\dfrac{1}{R_{81}}+\dfrac{1}{R_{82}}+\dfrac{1}{R_{83}}}\right]}$$

Here again, the resistance of the series connected, conducting diodes is negligible and the slope of line 63 can be varied by varying the value of resistance 83.

When the input potential ($e_{in}$) exceeds three units (3 × 0.7 volts), the series diodes in the resistance 84 path conduct; when the input potential exceeds four units (4 × 0.7 volts), the series diodes in the resistance 85 path conduct, and so on. Thus, a piecewise linear approximation to the parabolic curve of FIG. 2 is achieved as illustrated in FIG. 6. The slope of the parabolic linear segment curve of FIG. 6 between any two of the higher order absolute values of input potential ($e_{in}$) is as follows:

$$m_n \rightarrow (n+1) = \frac{R_{80}}{R_{80} + \left[\frac{1}{R_{81}} + \frac{1}{R_{82}} \cdots \frac{1}{R_n} + \frac{1}{R_{n+1}}\right]}$$

It will be apparent to those in the art that one might readily calculate the values of resistances 80–86 needed to achieve the linear segment curve of FIG. 6. A simpler approach, however, is to merely monitor the output of the function generator using an oscilloscope with a template of the desired curve overlying the face of the oscilloscope. The resistance 80–86 can then be varied to bring the function generator output signal into correspondence with the desired template curve. This procedure need be carried out only for the prototype of a production run of a given cathode ray tube type. Once the desired shaped curve is achieved, the settings of the calibrated resistances 80–86 is noted and fixed resistances of corresponding values can be used in the circuitry of the remaining tubes of the production run.

The range of the curve of FIG. 6 can, of course, be extended and/or the approximation or accuracy improved by using more parallel connected paths in the function generator. Moreover, after a linear segment curve of desired configuration (e.g., parabolic) is arrived at, the resistance 80 can be varied to compress or expand the curve but this in no way affects the general configuration of the curve. That is, even though expanded or compressed it will remain parabolic.

Figure 7:
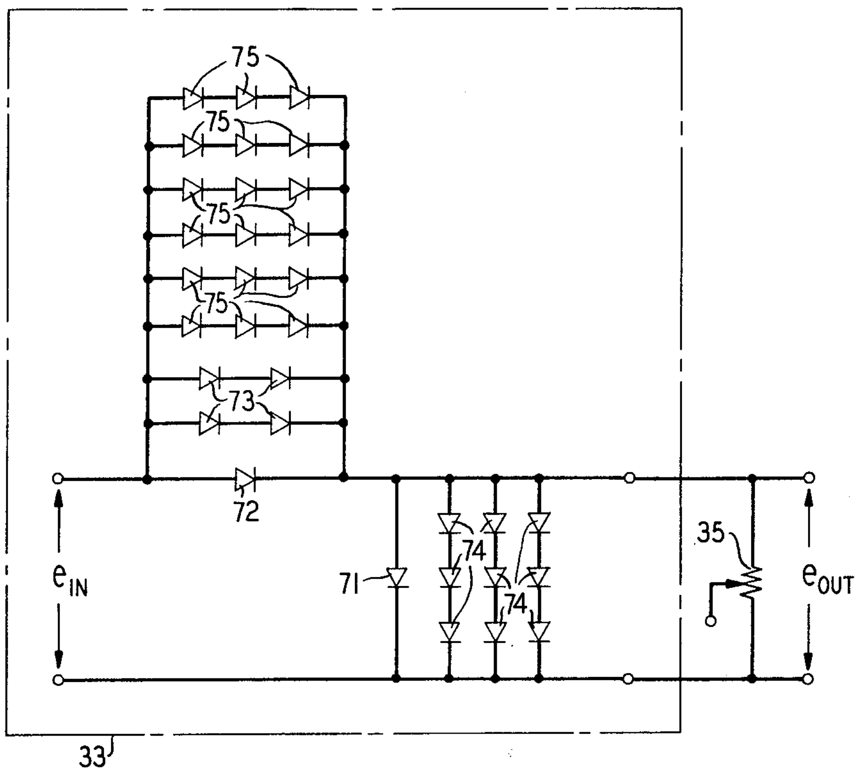
FIG. 7 is a schematic diagram of a preferred function generator composed entirely of diodes.

FIG. 7 illustrates a preferred embodiment of the function generator 33, composed entirely of diodes. Since such a circuit can be quite readily manufactured in accordance with integrated circuit techniques it is exceedingly compact and relatively inexpensive. Moreover, as will be evident hereinafter, this circuit is extremely versatile in the variety of functions that can be generated.

Figure 8:
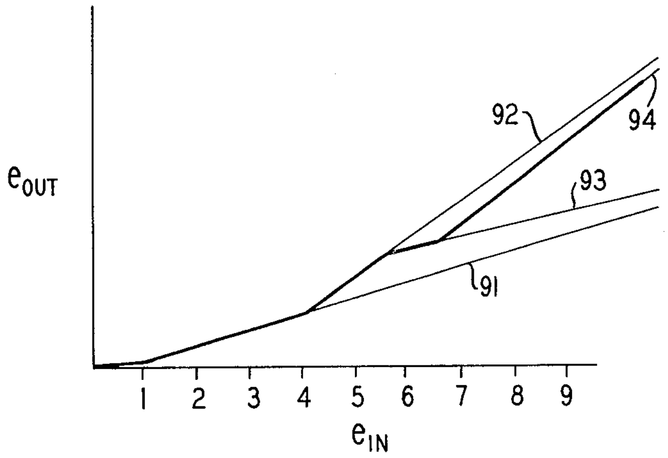
FIG. 8 is a diagram useful in the explanation of the operation of the function generator of FIG. 7.

The all diode function generator 33 of FIG. 7 is, for purposes of explanation, of relatively simple circuit configuration. FIG. 8 represents the function or curve provided by the all diode generator of FIG. 7. The linear segment curve of FIG. 8 is admittedly unusual and is intended for illustrative purposes only. In particular, it illustrates that a linear segment curve can be obtained having segments of decreasing as well as increasing slopes.

In general, the forward barrier potentials or break point voltages of the diode paths of FIG. 7 are controlled by the number of diodes connected in series, and the slopes of the linear segment curve of FIG. 8 are controlled by the number of series strings of a given length (i.e., number of series connected diodes) connected in parallel. Accordingly, it will be apparent that a number of different functions or curves (e.g., parabolic, hyperbolic, et cetera) can be arrived at by the simple expedient of temporarily connecting given strings of series connected diodes into the function generator circuit and observing the effect thereof by monitoring the output of the function generator with an oscilloscope. A desired linear segment curve can, of course, be arrived at by mathematical calculation but the mathematics here becomes cumbersome.

For input voltages ($e_{in}$) of less than absolute 1 (i.e., <0.7 volt), only a small diode leakage current flows through the external load resistance 35. Resistance 35 is approximately 10K ohms. When the input potential ($e_{in}$) exceeds one unit (0.7 volts), the forward barrier voltage of diode 72 is exceeded and the same now conducts. The resistance of a conducting silicon diode, for example, is about 100 ohms and it remains more-or-less constant until the diode's power dissipation capability is exceeded. Accordingly, substantially all of the input potential ($e_{in}$) appears across resistance 35. An additional fractional increase in the input potential ($e_{in}$) now causes the voltage drop across resistance 35 to exceed the forward barrier voltage of diode 71 and thus the latter begins conduction. The resistance of diode 71 therefore also drops to about 100 ohms, i.e., its resistance now equals that of diode 72. The resistance 70 is connected in shunt with diode 71 but its relative value of resistance is so high that it has little further effect on the circuit. The potential developed across the conducting diode 71, and the slope *m* of the line 91 of FIG. 8, is a function of the ratio of the resistance value of diode 71 to the total resistance i.e., the resistance of diode 71 plus the resistance of diode 72). This slope is as follows:

$$m = R_{D71}/(R_{D71} + R_{D72})$$

where $R_{D71}$ = the resistance of diode 71, $R_{D72}$ = the resistance of diode 72.

When the input potential ($e_{in}$) reaches a value of four units (4 × 0.7 volt), the drop across diode 71 is two units (2 × 0.7 volt), the drop across diode 72 is also two units, and therefore the series connected diodes 73 begin conducting. Since there are two series connected diodes 73 in each of two shunt paths, the equivalent resistance of these two shunt paths is equal to the resistance of a single diode 73 (i.e., $R_{D73}$). The potential now developed across the diode 71, and the slope *m* of the line 92 of FIG. 8, is a function of the ratio of the resistance of diode 71 to the total circuit resistance, which comprises the resistance of diode 71 plus the equivalent resistance of diode 72 in shunt with equivalent resistance $R_{D73}$. The slope of line 92 of FIG. 8 is:

$$m = \frac{R_{D71}}{R_{D71} + \left[\frac{1}{\frac{1}{R_{D72}} + \frac{1}{R_{D73}}}\right]}$$

This slope will, of course, be somewhat greater than the slope of line 91. Actually, the slope of line 91 is 1:2, while that at line 92 is 2:3.

When the input potential ($e_{in}$) reaches a value of five and one-half units (5.5 × 0.7 volt), the drop across diode 71 is three units (3 × 0.7 volt) and thus the series connected diodes 74 begin conducting. Since there are three series connected diodes 74 in each of three shunt paths, the equivalent resistance of these three shunt paths is equal to the resistance of a single diode 74 (i.e., $R_{D74}$). The output potential and the slope *m* of the line 93 are a function of the ratio of the equivalent resistance of the parallel connection of diodes 71 and 74 to the total circuit resistance, which comprises the equivalent resistance of the parallel connected diodes 71 and 74 plus the equivalent resistance of the parallel connected diodes 72 and 73. The slope of line 93 of FIG. 8 is given as follows:

$$m=\frac{\left[\frac{1}{\frac{1}{R_{D71}}+\frac{1}{R_{D74}}}\right]}{\left[\frac{1}{\frac{1}{R_{D71}}+\frac{1}{R_{D74}}}\right]+\left[\frac{1}{\frac{1}{R_{D72}}+\frac{1}{R_{D73}}}\right]}$$

It should be readily apparent that the slope of line 93 of FIG. 8 is less than the slope of line 92. Simple computation will show that the slope of line 93 is 1:2.

When the input potential ($e_{in}$) reaches a value of six and one-half units (6.5 × 0.7 volt), the output potential ($e_{out}$) will be three and one-half units (3.5 × 0.7 volt), and a differential potential of three units will exist across the six shunt paths comprised of diodes 75. The latter shunt paths, therefore, begin to conduct. Since there are three series connected diodes 75 in each of six shunt paths, the equivalent resistance of these six shunt paths is equal to one-half the resistance of a single diode 75 i.e., $R_{D75/2}$). With all of the diodes of the circuit of FIG. 7 now conducting the slope 94 of the curve of FIG. 8 is as follows:

$$m=\frac{\left[\frac{1}{\frac{1}{R_{D71}}+\frac{1}{R_{D74}}}\right]}{\left[\frac{1}{\frac{1}{R_{D71}}+\frac{1}{R_{D74}}}\right]+\left[\frac{1}{\frac{1}{R_{D72}}+\frac{1}{R_{D73}}+\frac{1}{R_{D75/2}}}\right]}$$

This slope will be somewhat greater than the slope of line 93 of FIG. 8.

It perhaps needs repeating that the function generator circuit of FIG. 7 and the resultant curve of FIG. 8 are for illustrative purposes only. A parabolic linear segment curve is more typical of the function required and this can be readily achieved by the empirical approach previously described.

Should the cathode ray tube 37 of FIG. 3 use electromagnetic focusing instead of electrostatic focusing, a voltage to current conversion amplifier 36 would be utilized to drive the focus coils. A number of high current, power transistor amplifiers are available for this purpose (e.g., a CELCO PP2N-5 amplifier circuit can be used here). It should thus be apparent to those in the art that the principles of the present invention can be advantageously utilized with any cathode ray tube (i.e., any camera or display tube) irrespective of whether the electron beam of the same is electrostatically or electromagnetically focused, or whether it is electrostatically or electromagnetically deflected. Accordingly, it is to be understood that the foregoing disclosure is merely illustrative of the principles of the present invention and numerous modifications and alterations may be made therein without departing from the spirit and scope of the invention.

What is claimed is:

1. In combination with a cathode ray tube having electron beam deflection and focusing means and a source of horizontal and vertical deflection signals therefore, a dynamic focus correction circuit comprising means for vectorially combining the horizontal and vertical deflection signals in accordance with the Pythagorean theorem so as to derive a vector signal directly proportional to the radial displacement of a focused beam spot from the center of the tube face, means for variably shaping said vector signal so that the same varies in correspondence with the cathode ray tube's optimum focus signal versus radial displacement characteristic, and means for coupling the shaped output signal from the last recited means to the focusing means of the cathode ray tube.

2. A dynamic focus correction circuit as defined in claim 1 including a unidirectional signal source which supplies a center focus signal to said focusing means to achieve optimum focusing of the beam spot at the center of the tube face, said shaped output signal being superimposed on said center focus signal to augment the same.

3. A dynamic focus correction circuit as defined in claim 2 wherein the shaping means comprises a function generator composed entirely of diodes.

4. Dynamic focus correction apparatus for a cathode ray tube having electron beam deflection and focus elements, said apparatus comprising respective sources of horizontal and vertical deflection voltages, means for vectorially summing the horizontal and vertical deflection voltages in accordance with the Pythagorean theorem so as to obtain a vector voltage proportional to the radial distance of a beam spot from the center of the tube face, a function generator means for variably shaping the vector voltage so that the same varies in a manner so as to substantially match the tube's optimum focus versus radial displacement characteristic, and means for coupling the shaped output signal from the function generator means to the focus element(s) of the cathode ray tube.

5. Dynamic focus correction apparatus as defined in claim 4 wherein the tube's optimum focus versus radial displacement characteristic is radially symmetrical and parabolic in configuration, and the shaped output signal from the function generator means is also substantially parabolic in configuration.

6. Dynamic focus correction apparatus as defined in claim 5 including a unidirectional signal source which supplies a center focus signal to said focus element(s) of an amplitude such as to ensure optimum focusing of the beam spot at the center of the tube face, said output signal of the function generator means being superimposed on said center focus signal so as to augment the same and thereby achieve optimum focusing over the entire image area of the tube.

7. Dynamic focus correction apparatus as defined in claim 6 wherein the function generator means consists entirely of diodes.

8. Dynamic focus correction apparatus as defined in claim 4 wherein the all diode function generator comprises a plurality of diode paths connected in shunt with each diode path comprising one or more series connected diodes, the break point voltages of a given diode path being determined by the number of diodes connected in series, with the slopes of the input versus output curve of the function generator being determined by the number of series diode strings of a given length connected in parallel.

9. Dynamic focus correction apparatus as defined in claim 8 including means for controlling the relative peak-to-peak voltage ratio of the horizontal and vertical input voltages to the vector summing means so that said ratio is equal to the aspect ratio of the cathode ray tube.

10. Dynamic focus correction apparatus as defined in claim 9 wherein said means for coupling the shaped output signal of the function generator to said focus element(s) comprises an amplifier stage that complements the cathode ray tube's focusing arrangement.

11. Dynamic focus correction apparatus for a cathode ray tube having electron beam deflection and focus elements and sources of horizontal deflection voltage ($V_h$) and vertical deflection voltage ($V_v$), said focus correction apparatus comprising a vector summer for deriving a vector voltage ($V_r$) that is proportional to the radial displacement of a beam spot from the center of the tube face with the voltage ($V_r$) defined by the equation $$V_r = \sqrt{V_h^2 + V_v^2},$$

an all diode function generator coupled to the output of said vector summer for shaping the vector voltage so as to substantially match the cathode ray tube's optimum focus voltage versus radial displacement characteristic, and means for complementary coupling the shaped output signal of the function generator to the focus element(s) of the cathode ray tube.

12. Dynamic focus correction apparatus as defined in claim 11 wherein the tube's optimum focus voltage versus radial displacement characteristic is radially symmetrical and approximately parabolic in shape, and the shaped output signal of said function generator closely approximates the cathode ray tube's characteristic shape.

13. Dynamic focus correction apparatus as defined in claim 12 wherein the sources of horizontal and vertical deflection voltages serve to raster scan the electron beam of the cathode ray tube.

* * * * *